US010522940B2

(12) United States Patent
Siwek et al.

(10) Patent No.: US 10,522,940 B2
(45) Date of Patent: Dec. 31, 2019

(54) METHOD OF MANUFACTURING SEALED ELECTRICAL CONNECTOR

(71) Applicant: Aptiv Technologies Limited, Barbados (BB)

(72) Inventors: Bartlomiej Siwek, Cracow (PL); Vincent Regnier, Spardorf (DE); Florian Schoenenberg, Nürnberg (DE); Ryszard Milkowski, Cracow (PL)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 16/517,060

(22) Filed: Jul. 19, 2019

(65) Prior Publication Data

US 2019/0341720 A1 Nov. 7, 2019

Related U.S. Application Data

(62) Division of application No. 16/181,931, filed on Nov. 6, 2018.

(30) Foreign Application Priority Data

Nov. 22, 2017 (EP) .................................... 17203074

(51) Int. Cl.

| | |
|---|---|
| ***B23P 23/00*** | (2006.01) |
| ***H01R 13/52*** | (2006.01) |
| ***H01R 13/506*** | (2006.01) |
| ***H01R 43/00*** | (2006.01) |
| ***H01R 13/641*** | (2006.01) |

(52) U.S. Cl.
CPC ....... *H01R 13/5219* (2013.01); *H01R 13/506* (2013.01); *H01R 13/5202* (2013.01); *H01R 13/5221* (2013.01); *H01R 13/641* (2013.01); *H01R 43/005* (2013.01); *H01R 2201/26* (2013.01)

(58) Field of Classification Search
CPC ................. B25B 27/0028; Y02E 60/12; H01L 2924/01079; B21D 53/10
USPC ...................... 29/402.02, 623.4, 843, 898.11
See application file for complete search history.

(56) References Cited

U.S. PATENT DOCUMENTS 7,131,854 B1 * 11/2006 Pavlovic ............ H01R 13/6273 439/352
7,247,039 B2 * 7/2007 Annecke ............ H01R 13/6666 439/188
7,766,685 B2 * 8/2010 Pabst .................. H01R 13/533 439/352

(Continued)

*Primary Examiner* — Phuong Chi Thi Nguyen
(74) *Attorney, Agent, or Firm* — Robert J. Myers

(57) ABSTRACT

A method for manufacturing a sealed electrical wire harness includes the steps of providing an equipped connector housing with electrical terminals inserted within the equipped connector housing and with electrical wires attached and electrically connected to the electrical terminals, providing an injection molding tool suitable for injecting sealing material, placing the equipped connector housing into the injection molding tool, closing the injection molding tool, filling the equipped connector housing with sealing material, thereby distributing the sealing material inside the equipped connector housing to a wire inlet portion, a connector position assurance holder portion, and an interface portion, and removing the sealed electrical wire harness from the injection molding tool.

18 Claims, 8 Drawing Sheets

E-E

(56) References Cited

U.S. PATENT DOCUMENTS

| | | | | |
|---|---|---|---|---|
| 9,614,323 | B2 * | 4/2017 | Chen | H01R 13/6273 |
| 10,218,106 | B2 * | 2/2019 | Wang | H01R 11/05 |

* cited by examiner

METHOD OF MANUFACTURING SEALED ELECTRICAL CONNECTOR

CROSS-REFERENCE TO RELATED APPLICATION

This application is a divisional application of co-pending U.S. patent application Ser. No. 16/181,931, filed on Nov. 6, 2018, which claims the benefit under 35 U.S.C. § 119(a) of Patent Application No. 17/203,074.4 filed in the European Patent Office on Nov. 22, 2017, the entire disclosure of each of which is hereby incorporated by reference.

TECHNICAL FIELD OF THE INVENTION

The invention relates to a sealed electrical connector for connecting safety devices in vehicles and a method of manufacturing such a sealed electrical connector.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
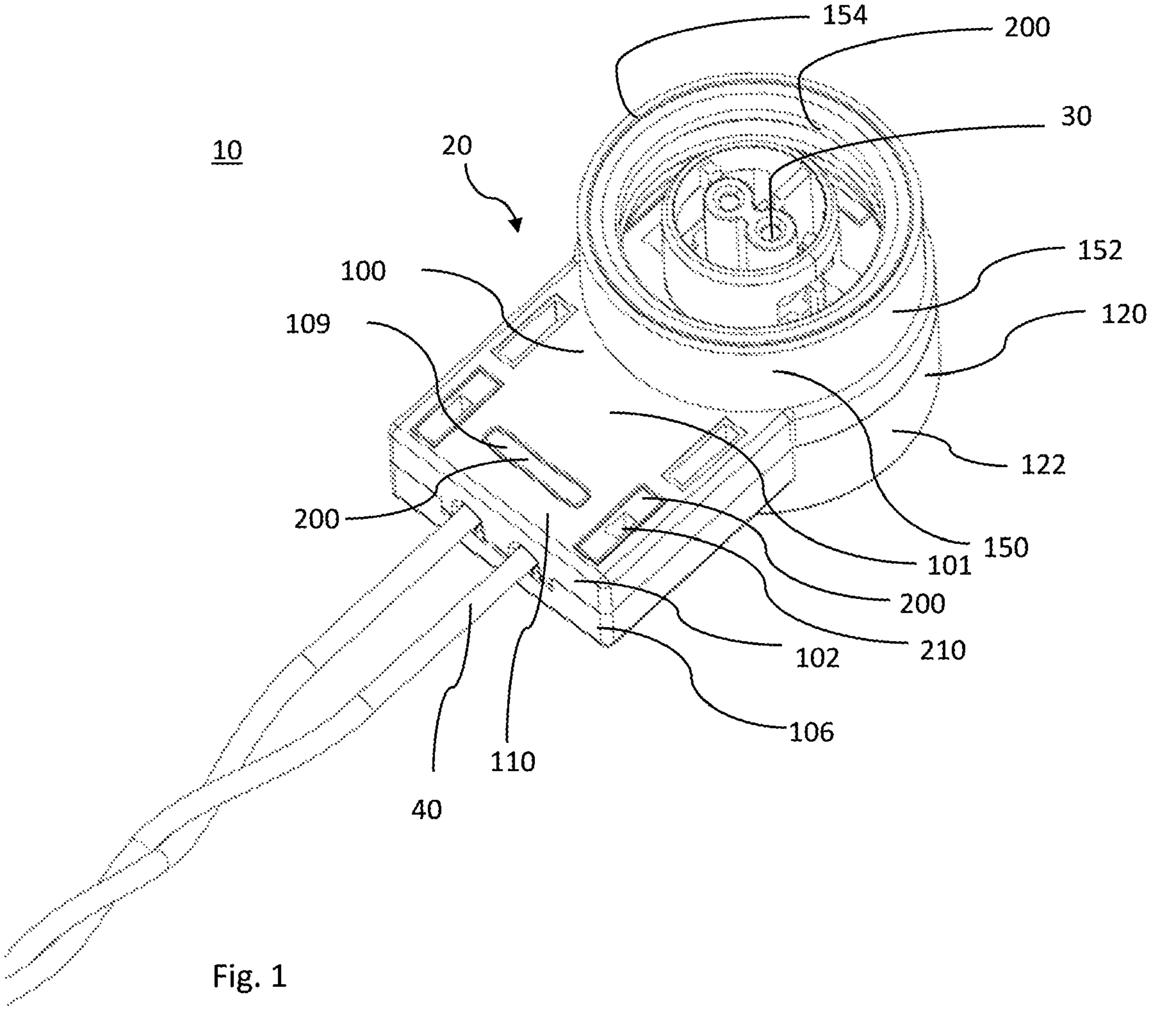
FIG. 1 is a perspective view of an interface portion of a sealed electrical wire harness, according to an embodiment of the invention.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The present application discloses an electrical wire harness for connecting safety devices in vehicles. The wiring harness includes a sealed an electrical connector, including a connector housing having a wire inlet portion, a connector position assurance holder portion, and an interface portion. An electrical terminal is located and electrically connected to an electrical wire inside an internal cavity that is located central inside the connector housing. The internal cavity extends into the interface portion. The electrical wire extends to outside the connector housing passing the wire inlet portion, that is located between the internal cavity and the outside of the connector housing. A flexible sealing member, configured to seal the internal cavity, when the electrical connector is electrically connected to a counter connector and when a connector position assurance device is activated in the connector position assurance holder portion to mechanically lock the electrical connector to the counter connector. The flexible sealing member is made in one piece.

The disclosed invention provides a sealed electrical wire harness that is usable to connect safety devices of vehicles that are located outside the dry passenger compartment. The seal, located in the connector housing, for sealing the sensitive contact area against humidity and dirt coming from outside, is not pre-manufactured and inserted in the connector housing as usually done in the art. In contrary the connector housing of the inventive sealed electrical wire harness gets the flexible sealing member when all parts are preassembled. The flexible sealing member is defined inside the connector housing, the connector position assurance holder portion and the interface portion after the fluid sealing material is pressed in an injection molding tool in which the connector housing is received. An inlet opening in the connector housing is internal connected to channels that distribute the injected sealing material to the portions where sealing is requested. Due to the portions are interconnected by fluid connection to the inlet opening, the fluid sealing material can flow through the channel, pushed by the injection machine. After finishing the injection molding process all portions are provided with the correct amount of sealing material. To become solid, the sealing material has to cool down. After cooling down the flexible sealing member is one part.

According to a preferred embodiment, the flexible sealing member is made of silicone or materials including silicone. Silicone is a well discovered material with very good sealing properties. Silicone can be used in a fluid state and then transformed into a solid-state. In this application the silicone is injection molded in fluid state, having a high temperature. After cooling the flexible sealing member as a solid body. The flexible sealing member could also be made of a thermoplastic elastomer (TPE).

Preferably, the interface portion includes a sleeve shaped interface shroud extending from the connector housing. A part of the flexible sealing member is arranged on an interface inner surface of the sleeve shaped interface shroud. To seal the interface, portion a ring-shaped structure this provided that surrounds a portion of a counter connector when plugged together, thereby sealing the space between the interface inner surface and the portion of a counter connector. The flexible sealing member can extend from the interface inner surface in alternating distance, thereby forming a wave profile. The wave profile can improve handling while connecting and the sealing along the lifetime.

Advantageously, the connector position assurance holder portion includes a sleeve shaped connector position assurance holder shroud extending from the connector housing. A part of the flexible sealing member is arranged on an inner connector position assurance holder surface of the sleeve shaped connector position assurance holder shroud. To seal the connector position assurance holder portion a ring-shaped structure this provided that surrounds a portion of a connector position assurance device when plugged together, thereby sealing the space between the sleeve shaped connector position assurance holder shroud and the portion of the connector position assurance device. The flexible sealing member can extend from the sleeve shaped connector position assurance holder shroud in alternating distance, thereby forming a wave profile. The wave profile can improve handling while connecting and the sealing along the lifetime.

Advantageously, the wire inlet portion includes an inlet cavity located inside the connector housing. A part of the flexible sealing member fills the inlet cavity, thereby sealingly surrounding a portion of the electrical wire passing the inlet cavity. The electrical wire is surrounded from a massive seal portion, while extending from the internal cavity, to outside the connector housing. Because the cavity has a certain length along the way of the wire, a certain length of the wire can be provided with feeling material. Because the injection molding is conducted with high temperature the outer insulation of the wire can glue to the seal material after cooling down. This provides very effective sealing.

Preferably, the connector housing includes a channel that connects the interface portion, the connector position assurance holder portion and the wire inlet portion. A part of the flexible sealing member extends through the channel. Providing the channel inside the connector housing reduces the overall size of the connector compared to prior art. The seal is also protected from mechanical influences.

Preferably the connector housing includes a first housing part and a second housing part. The first housing part has an arm with a hook shaped end, including a first surface facing towards the first housing part. The second housing part has an edge including a second surface facing the second housing part. The first surface is arranged opposite the second surface when the first housing part and the second housing part are assembled. A part of the flexible sealing member is arranged in between the first surface and the second surface. The first housing part and the second housing part can be assembled by a snap fit connection as known in the art. This connection provides a fast and easy connection method. But also alternative connecting methods as screwing or welding can be used to connect the first housing part and the second housing part. Because the flexible sealing member is also present between the first surface and the second surface there is no play between the first housing part and the second housing part that prevent problems when vibration is applied to the connector.

In a preferred embodiment, a part of the channel is defined by the first surface and the second surface. Due to the first surface and the second surface are spaced apart while the injection molding process the space in between can be used as channel for the sealing material.

Preferably, the first housing part includes a wall extending perpendicular from a first inner surface towards a second inner surface of the second housing part, thereby touching the second inner surface. The wall furthermore extends between the first inner surface and the second inner surface, thereby defining separate spaces inside the connector housing. The inner surfaces of the housing part are substantially parallel with space in between. Protrusions or walls that start perpendicular from one inner surface contact the opposite inner surface if extending far enough. The walls extend parallel to the inner surfaces, thereby dividing the space between the inner surfaces. Dependent on the routing of the walls, the space between the surfaces can be divided into separate cavities.

Advantageously, a wall defines a part of the internal cavity. A wall that surrounds a portion in the center of the connector housing where the terminals are located defines, in addition with the inner surfaces, a protective cavity. The terminals are protected from the cover of the connector housing and from the wall inside the connector housing.

Preferably, the wall also defines a part of the channel. The space between the internal cavity and the remaining inner space of the connector housing can be used as channel for the seal material.

In a preferred embodiment, the connector housing includes an opening connecting the channel to the outside the connector housing. A part of the flexible sealing member is present in the opening and flush with the housing outer surface of the connector housing. The part of the flexible sealing member that is visible in the opening gives an indication about the quality of the flexible sealing member.

Advantageously, the flexible sealing member that is present in the opening includes an indentation. The indentation extends inwards the connector housing. The indentation in the flexible sealing member gives an indication about the quality of the flexible sealing member in deeper layers.

Preferred, is a connector housing for a sealed electrical wire harness. The connector housing includes a first housing part and a second housing part configured to define the connector housing. The first housing part has an arm with a hook shaped end, including a first surface facing the first housing part. The second housing part has an edge including a second surface facing the second housing part. The first surface is arranged opposite the second surface when the first housing part and the second housing part are in an assembled state. The hook shaped end is configured to keep the first surface spaced apart from the second surface when the first housing part and the second housing part are hold against each other. The first housing part and the second housing part can be assembled by a snap fit connection as known in the art. This connection provides a fast and easy connection method. The arm has a length that is slightly longer as used in a standard snap connection. This results in a shaky connector housing in assembled state. That is no problem while handling in production process because the two housing parts are still hold together. When hold together while injection molding, the longer arm keeps the first surface in a distance from the second surface defining a channel. Alternative connecting methods as screwing or welding can be used to connect the first housing part and the second housing part.

A method to manufacture a sealed electrical wire harness in accordance with the above mentioned features is also presented. The method includes the steps of:

- providing an equipped connector housing, with electrical terminals inserted within the connector housing and with electrical wires attached and electrically connected to the electrical terminals;
- providing an injection molding tool suitable for injecting sealing material. The injection molding tool includes a heating protrusion configured to extend inside the connector housing, through a connector housing opening;
- placing the equipped connector housing into the injection molding tool;

closing the injection molding tool thereby covering the connector housing tightly. The heating protrusion protrudes inside the connector housing;

filling the connector housing with sealing material, thereby distributing the sealing material inside the connector housing, to the wire inlet portion, connector position assurance holder portion and the interface portion. The heating protrusion is flowed by the sealing material; and removing the sealed electrical wire harness from the injection molding tool.

The disclosed method provides additional energy (heating) into the sealing material while distributing the sealing material to the requested portions. This improves the fluidity of the sealing material. A better fluidity of the sealing material supports a faster production process and better quality of the final seal.

FIG. 1 shows a perspective view of an interface portion 150 of a sealed electrical wire harness 10 for connecting safety devices in vehicles, including an electrical connector 20, including a connector housing 100, having a wire inlet portion 110, a connector position assurance (CPA) holder portion 120 and an interface portion 150. The interface portion 150 includes a sleeve shaped interface shroud 152 extending from the connector housing 100. A part of the flexible sealing member 200 is arranged on an interface inner surface 154 of the sleeve shaped interface shroud 152. An electrical terminal 30 is located and electrically connected to an electrical wire 40 inside an internal cavity 140 that is located central inside the connector housing 100. The connector housing 100 includes an opening 109 connecting the channel 160 to the outside of the connector housing. A part of the flexible sealing member 200 is present in the opening and flush with the housing outer surface 101 of the connector housing 100. The flexible sealing member 200 that is present in the opening includes an indentation 210. The indentation 210 extends inwards the connector housing 100.

Figure 2:
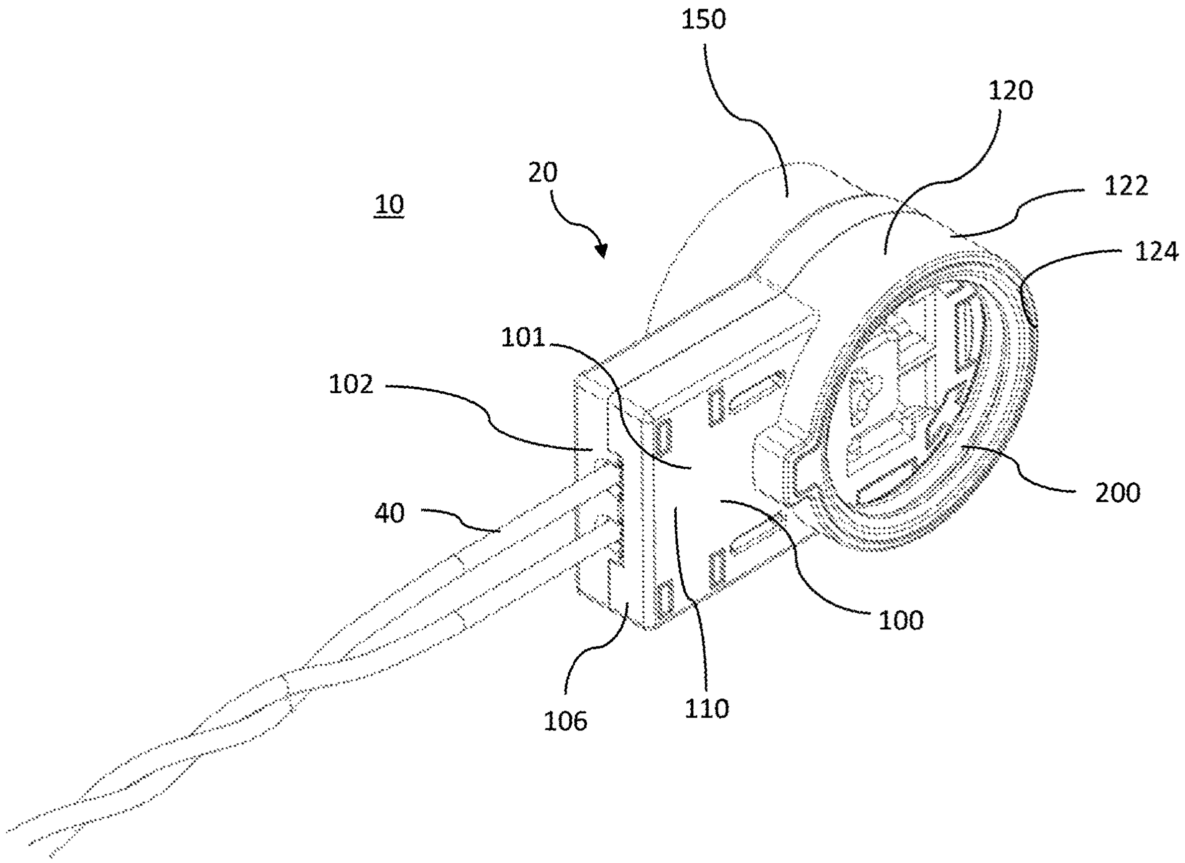
FIG. 2 is a perspective view of a connector position assurance holder portion of a sealed electrical wire harness, according to an embodiment of the invention.

FIG. 2 shows a perspective view of a CPA holder portion 120 of the sealed electrical wire harness 10. The CPA holder portion 120 includes a sleeve shaped CPA holder shroud 122 extending from the connector housing 100. A part of the flexible sealing member 200 is arranged on an inner CPA holder surface 124 of the sleeve shaped CPA holder shroud 122.

Figure 3:
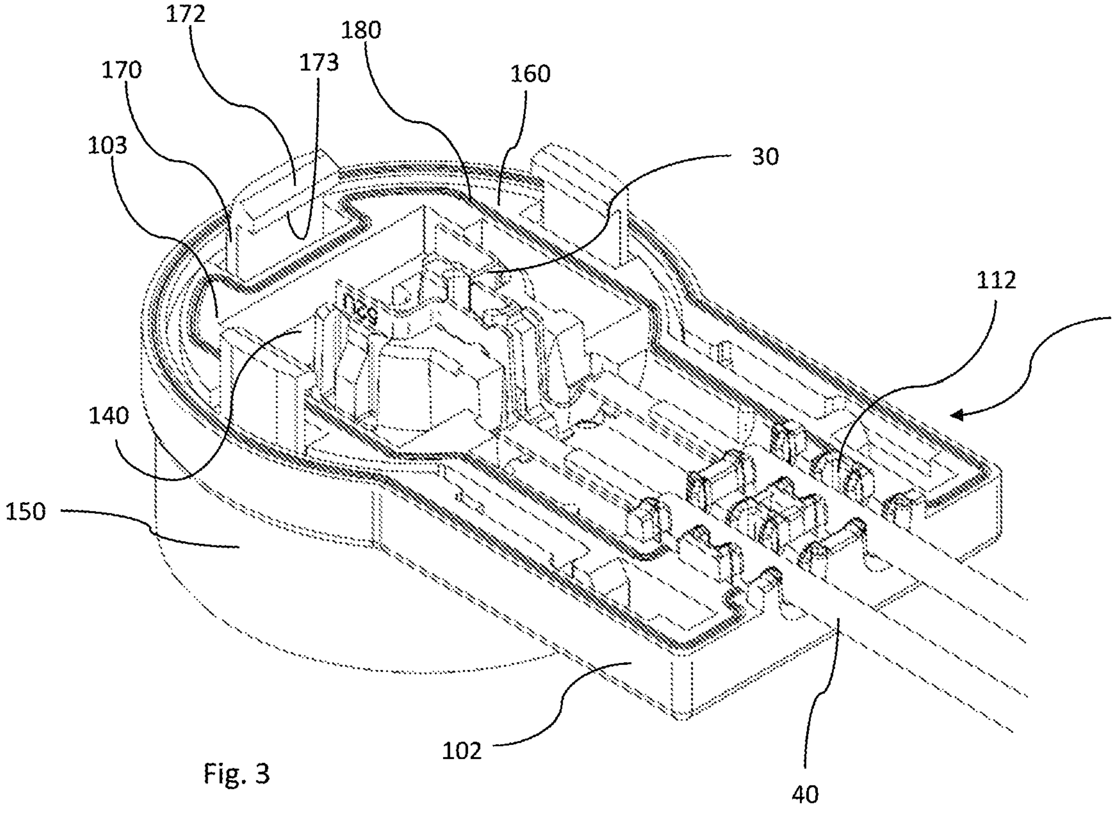
FIG. 3 is a perspective view of a first housing part of the sealed electrical wire harness, according to an embodiment of the invention.

FIG. 3 shows a perspective view of a first housing part 102 of the sealed electrical wire harness 10. The electrical terminal 30 is located and electrically connected to an electrical wire 40 inside an internal cavity 140 that is located central inside the connector housing 100. The internal cavity 140 extends into the interface portion 150. The electrical wire 40 extends to outside the connector housing 100 passing the wire inlet portion 110, that is located between the internal cavity 140 and the outside of the connector housing 100. The wire inlet portion 110 includes an inlet cavity 112 located inside the connector housing 100. The connector housing 100 includes a channel 160 that connects the interface portion 150, the CPA holder portion 120 and the wire inlet portion 110. The wall 180 defines a part of the internal cavity 140 and the wall 180 defines a part of the channel 160.

Figure 4:
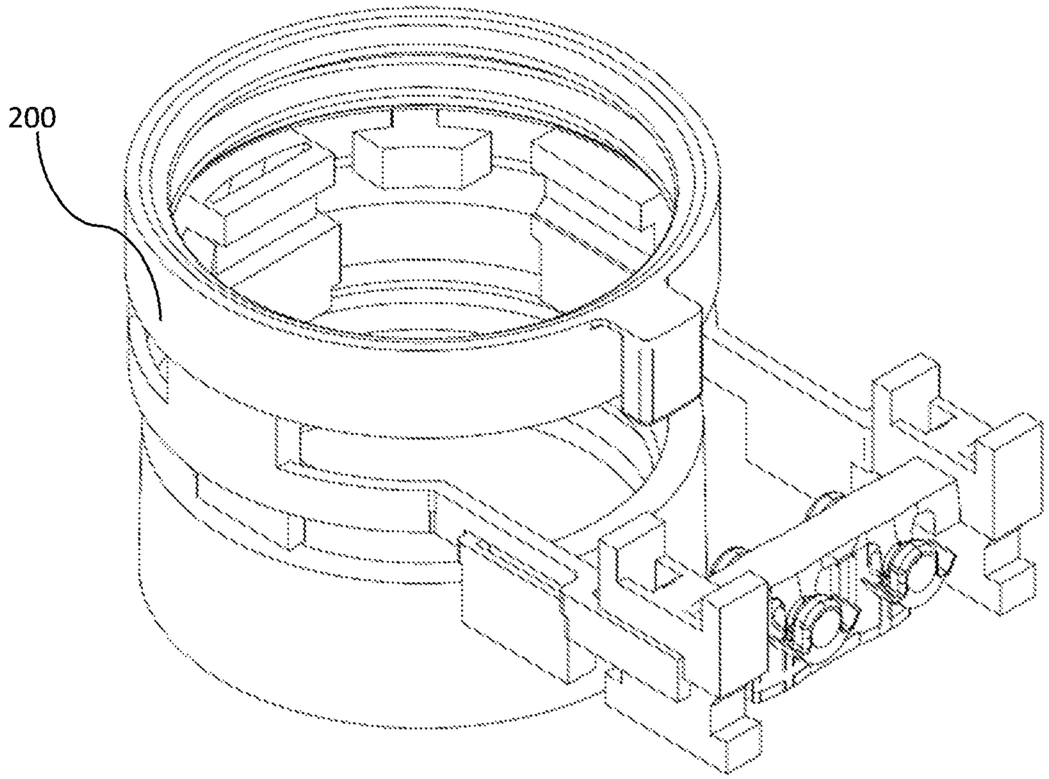
FIG. 4 is a perspective view of a flexible sealing member of the sealed electrical wire harness, according to an embodiment of the invention.

FIG. 4 shows a perspective view of a flexible sealing member 200 of the sealed electrical wire harness 10. The flexible sealing member 200 is made of silicone or materials including silicone.

Figure 5:
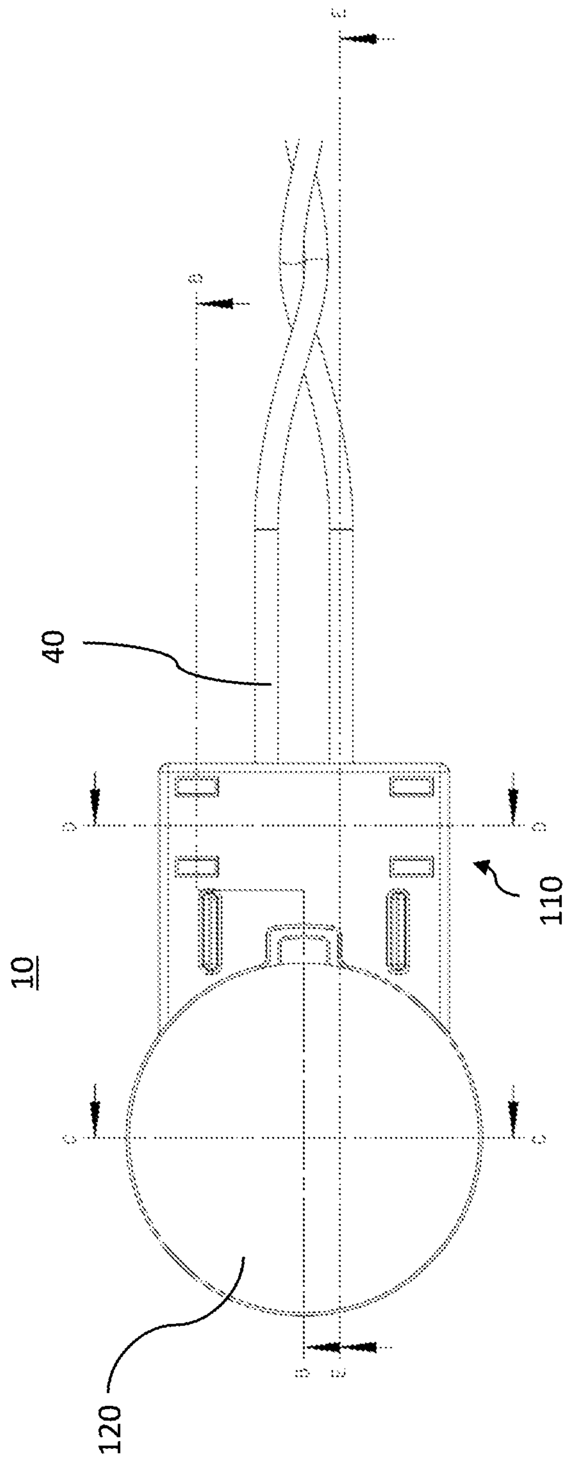
FIG. 5 is a top view of the sealed electrical wire harness to indicate the section lines of FIGS. 6-10, according to an embodiment of the invention.

FIG. 5 shows a top view of the sealed electrical wire harness to indicate the section lines of FIGS. 6-10. The view shows the CPA holder portion 120 of the sealed electrical wire harness 10.

Figure 6:
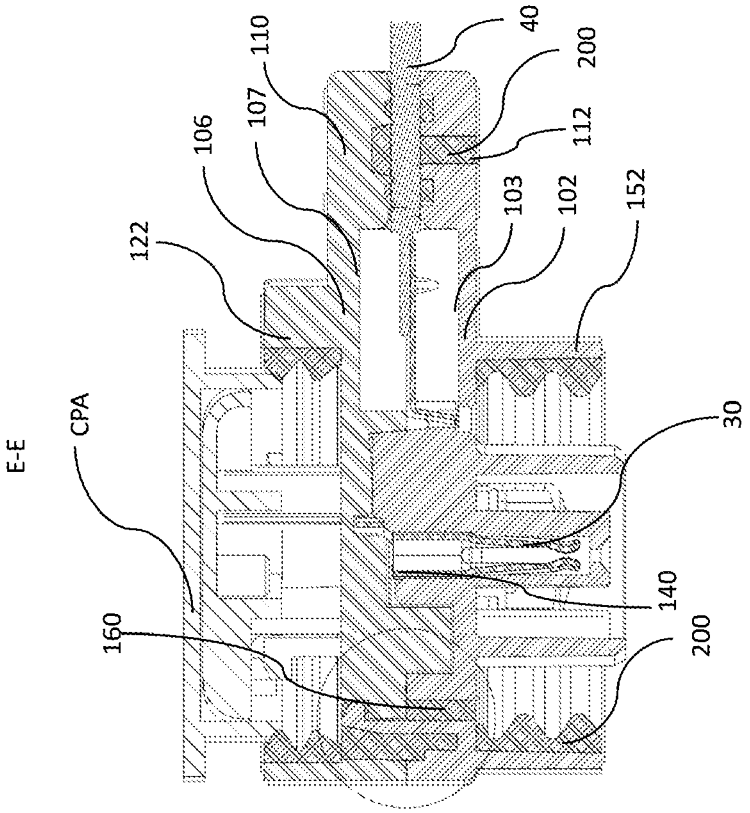
FIG. 6 is a cross section view of the sealed electrical wire harness along section line E-E, according to an embodiment of the invention.

FIG. 6 shows a cross section of the of the sealed electrical wire harness 10 along section line E-E. The flexible sealing member 200, is configured to seal the internal cavity 140, when the electrical connector 20 is electrically connected to a counter connector and when a connector position assurance device is activated in the CPA holder portion 120 to mechanically lock of the electrical connector 20 to the counter connector. The wire inlet portion 110 includes an inlet cavity 112 located inside the connector housing 100. A part of the flexible sealing member 200 fills the inlet cavity 112, thereby sealingly surrounding a portion of the electrical wire 40 passing the inlet cavity 112. The connector housing 100 includes a first housing part 102 and a second housing part 106. The first housing part 102 includes a wall 180 extending perpendicular from a first inner surface 103 towards a second inner surface 107 of the second housing part 106, thereby touching the second inner surface 107. The wall 180 furthermore extends between the first inner surface 103 and the second inner surface 107, thereby defining separate spaces inside the connector housing 100. The flexible sealing member 200 is made in one piece. A part of the flexible sealing member 200 extend through the channel 160.

Figure 7:
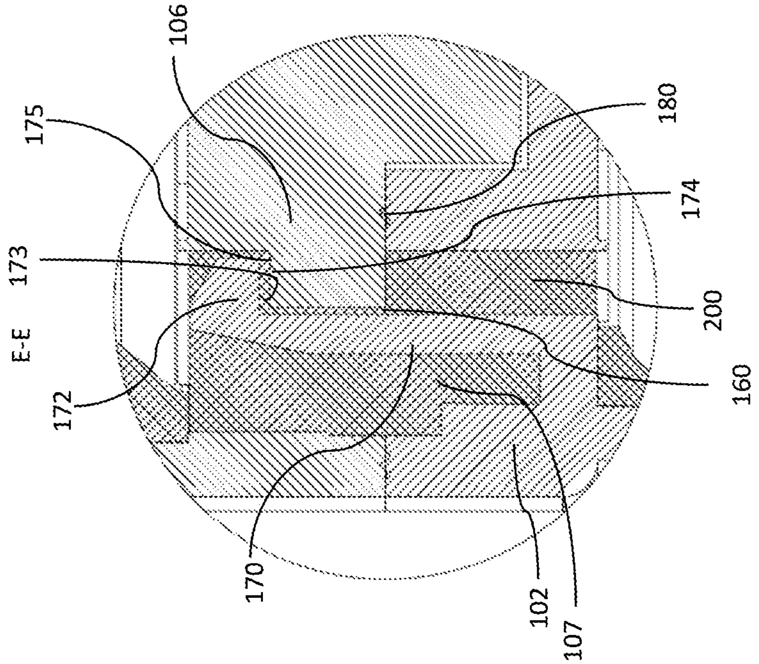
FIG. 7 is in an enlarged view details of FIG. 6, according to an embodiment of the invention.

FIG. 7 shows an enlarged view details of FIG. 6. The first housing part 102 has an arm 170 with a hook shaped end 172, including a first surface 173 facing towards the first housing part 102. The second housing part 106 has an edge 174 including a second surface 175 facing the second housing part 106. The first surface 173 is arranged opposite the second surface 175 when the first housing part 102 and a second housing part 106 are in an assembled state. A part of the flexible sealing member 200 is arranged in between the first surface 173 and the second surface 175. A part of the channel 160 is defined by the first surface 173 and the second surface 175.

Figure 8:
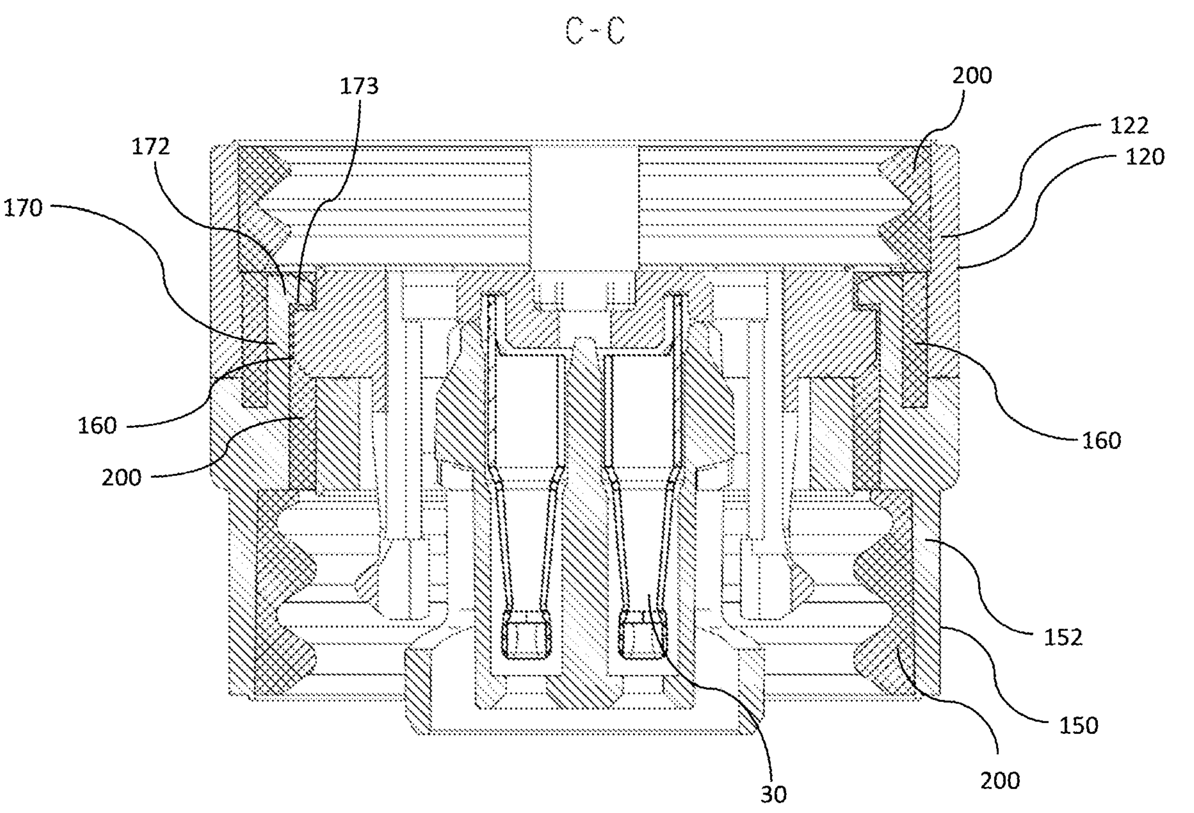
FIG. 8 is a cross section view of the sealed electrical wire harness along section line C-C, according to an embodiment of the invention.

FIG. 8 shows a cross section of the sealed electrical wire harness 10 along section line C-C. The connector housing 100 includes a channel 160 that connects the interface portion 150, the CPA holder portion 120 and the wire inlet portion 110. A part of the flexible sealing member 200 extend through the channel 160.

Figure 9:
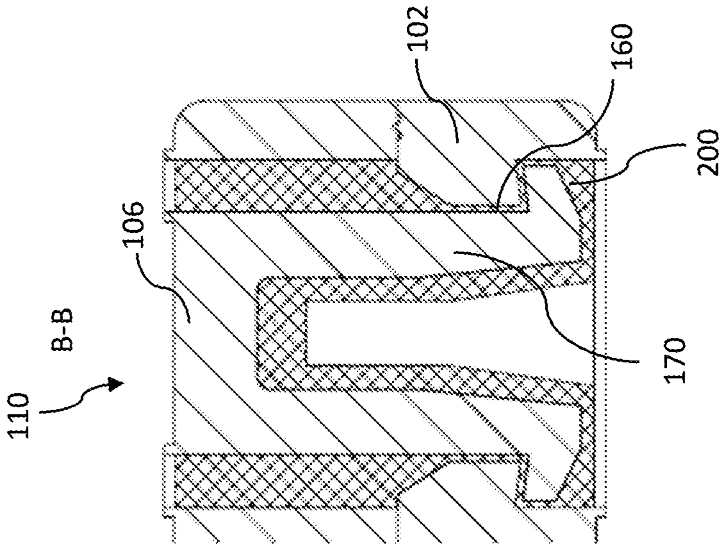
FIG. 9 is a cross section view of an inlet portion of the sealed electrical wire harness along section line C-C, according to an embodiment of the invention.

FIG. 9 shows a cross section of the wire inlet portion 110 of the sealed electrical wire harness along section line C-C. The connector housing 100 includes a channel 160 that connects the interface portion 150, the CPA holder portion 120 and the wire inlet portion 110. A part of the flexible sealing member 200 extends through the channel 160. The second housing part 106 has an arm 170 with a hook shaped end 172, including a first surface 173 facing towards the second housing part 106. The first housing part 102 has an edge 174 including a second surface 175 facing the first housing part 102. The first surface 173 is arranged opposite the second surface 175 when the first housing part 102 and a first housing part 102 are in an assembled state. A part of the flexible sealing member 200 is arranged in between the first surface 173 and the second surface 175. A part of the channel 160 is defined by the first surface 173 and the second surface 175.

Figure 10:
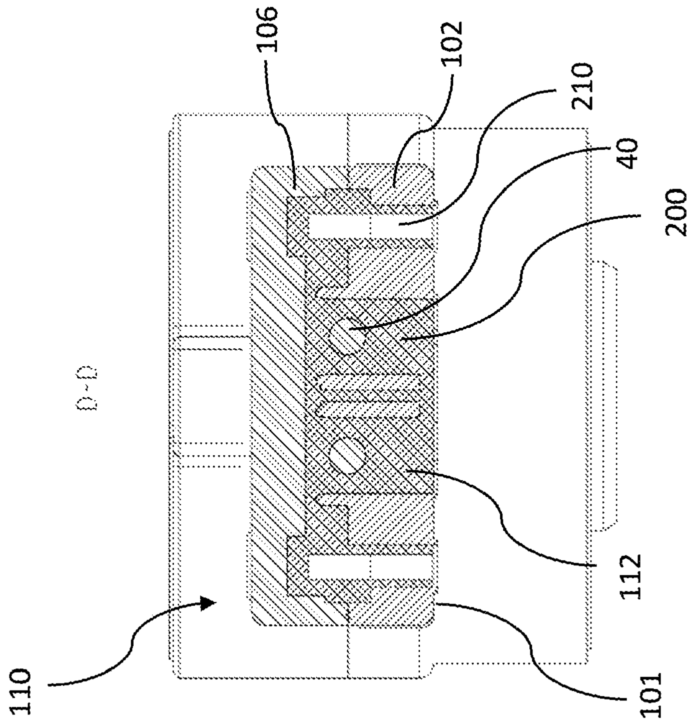
FIG. 10 is cross section view of an inlet portion of the sealed electrical wire harness along section line D-D.

FIG. 10 shows a cross section of the wire inlet portion 110 of the sealed electrical wire harness along section line D-D. The wire inlet portion 110 includes an inlet cavity 112 located inside the connector housing 100. A part of the flexible sealing member 200 fills the inlet cavity 112, thereby sealingly surrounding a portion of the electrical wire 40 passing the inlet cavity 112. The connector housing 100 includes a first housing part 102 and a second housing part 106.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A method for manufacturing a sealed electrical wire harness, comprising the steps of:

a) providing an equipped connector housing with electrical terminals inserted within the equipped connector housing and with electrical wires attached and electrically connected to the electrical terminals;

b) providing an injection molding tool suitable for injecting sealing material, wherein the injection molding tool includes a heating protrusion configured to extend inside the equipped connector housing through a connector housing opening;

c) placing the equipped connector housing into the injection molding tool;

d) closing the injection molding tool, thereby covering the equipped connector housing tightly, wherein the heating protrusion protrudes inside the equipped connector housing;

e) filling the equipped connector housing with the sealing material, thereby distributing the sealing material inside the equipped connector housing to a wire inlet portion, a connector position assurance holder portion, and an interface portion, wherein the heating protrusion is flowed by the sealing material; and f) removing the sealed electrical wire harness from the injection molding tool.

2. The method according to claim 1, wherein the sealing material is made of silicone or materials including silicone.

3. The method according to claim 1, wherein the connector housing includes a channel that connects the interface portion, the connector position assurance holder portion and the wire inlet portion.

4. The method according to claim 3, wherein the connector housing defines an internal cavity that is located central inside the connector housing.

5. The method according to claim 4, wherein the sealing material forms a flexible sealing member configured to seal the internal cavity when the connector housing is connected to a mating counter connector.

6. The method according to claim 5, wherein the flexible sealing member includes an indentation that extends inwards the connector housing.

7. The method according to claim 6, wherein the wire inlet portion includes an inlet cavity located inside the connector housing.

8. The method according to claim 7, wherein the flexible sealing member is made in one piece.

9. The method according to claim 5, wherein the connector housing includes a first housing part and a second housing part, wherein the first housing part has an arm with an hook shaped end, including a first surface facing towards the first housing part and wherein the second housing part has an edge including a second surface facing the second housing part, wherein the first surface is arranged opposite the second surface when the first housing part and the second housing part are assembled, wherein the part of the flexible sealing member is arranged in between the first surface and the second surface.

10. The method according to claim 9, wherein the first housing part includes a wall extending perpendicular from a first inner surface towards a second inner surface of the second housing part, thereby touching the second inner surface, wherein the wall furthermore extends between the first inner surface and the second inner surface, thereby defining separate spaces inside the connector housing.

11. The method according to claim 10, wherein the wall defines a part of the internal cavity.

12. The method according to claim 10, wherein the wall defines a part of the channel.

13. The method according to claim 12, wherein a part of the flexible sealing member is arranged on an interface inner surface of a sleeve shaped interface shroud.

14. The method according to claim 13, wherein the part of the flexible sealing member is arranged on an inner connector position assurance holder surface of a sleeve shaped connector position assurance holder shroud.

15. The method according to claim 13, wherein the part of the flexible sealing member fills the inlet cavity, thereby sealingly surrounding a portion of the electrical wires passing the inlet cavity.

16. The method according to claim 13, wherein the part of the flexible sealing member extends through the channel.

17. The method according to claim 13, wherein the connector housing includes an opening connecting the channel to the outside of the connector housing, wherein the part of the flexible sealing member is present in the opening and flush with a housing outer surface of the connector housing.

18. The method according to claim 17, wherein the flexible sealing member is present in the opening, wherein the flexible sealing member includes an indentation that extends inwards the connector housing.

* * * * *